United States Patent [19]

Corona et al.

[11] Patent Number: 5,083,159
[45] Date of Patent: Jan. 21, 1992

[54] PROCESS FOR INITIAL ALIGNMENT OF DOCUMENT ILLUMINATOR

[75] Inventors: Stephen C. Corona, Rochester; George A. Charnitski, Fairport, both of N.Y.; Richard F. Lehman, Nashua, N.H.; Charles J. Urso, Webster, N.Y.

[73] Assignee: Xerox Corporation, Stamford, Conn.

[21] Appl. No.: 707,512

[22] Filed: May 30, 1991

[51] Int. Cl.⁵ ............................................. G03G 21/00
[52] U.S. Cl. .................................. 355/208; 355/203; 355/228; 371/16.4; 371/29.1
[58] Field of Search ............... 355/202, 204, 208, 203, 355/205, 206, 207, 209, 210, 228, 229; 371/16.4, 25.1, 29.1; 358/406, 448; 364/525

[56] References Cited

U.S. PATENT DOCUMENTS

| | | | |
|---|---|---|---|
| 4,348,099 | 9/1982 | Fantozzi | 355/208 |
| 4,413,903 | 11/1983 | Corona et al. | 355/228 X |
| 4,464,681 | 8/1984 | Jacobs et al. | 358/285 |
| 4,467,364 | 8/1984 | Konagaya | 358/280 |
| 4,597,662 | 7/1986 | Hirata et al. | 355/209 |
| 4,709,147 | 11/1987 | Arai | 355/209 X |
| 4,943,834 | 7/1990 | Maeda et al. | 355/327 |

OTHER PUBLICATIONS

Xerox Pending Appln. No. D/90158, William A. Blitz et al.

*Primary Examiner*—A. T. Grimley
*Assistant Examiner*—Sandra L. Brasé

[57] ABSTRACT

A test procedure is provided for obtaining optimum illumination exposure in a document scanning an exposure system. A document illumination lamp is energized and reflection images from a document platen is transmitted through an optical system onto a linear photosensor array which is positioned in the normal exposure (image) plane. The array outputs, corresponding to individual photodiodes outputs, are amplified and processed under the control of a computer controlled software program to provide a real time display of the illumination characteristics on a display screen. The screen, in one embodiment, displays a colored bar graph which is superimposed against the horizontal line representing an in specification illumination level. The lamp and, or, illuminator, is repositioned while observing the bar graph until an optimum bar graph value is measured below the specification line. Other displays are provided to monitor and adjust performance of an infrared densitometer and to adjust the gain of the individual photodiodes which form the photosensitive array.

3 Claims, 5 Drawing Sheets

PROCESS FOR INITIAL ALIGNMENT OF DOCUMENT ILLUMINATOR

BACKGROUND AND MATERIAL DISCLOSURE STATEMENT

This invention relates to a xerographic reprographic system wherein the document to be copied is scan/illuminated by a linear illumination lamp, and more particularly, to a method for initially aligning the lamp so as to provide an initial optimum level of performance.

In a document reproduction system which incorporates a scanning optical system (moving illumination source, reflectors, mirrors, projection lens) to project an image of a document onto a photoreceptor surface, the exposure of a point on the photoreceptor is equal to the total irradiation received by the point as it scans through a slit. When a uniform density document is being imaged, a uniform exposure of the photoreceptor is desired. An optimum exposure level is initially set for each system at the time the particular reproduction system is manufactured and assembled.

Typically, the document illumination lamp is fixedly mounted in the proper location beneath the platen. Since the light output of the lamp used varies with the rotational position of the lamp, some method must be used to determine the rotational position which will produce the optimum exposure level at the image plane after being transmitted through the system optical path (projection lens, and scan and folding mirrors). The conventional method has heretofore relied on repeated trial and error techniques, wherein the lamp is incrementally moved or rotated and a series of illumination readings are taken at the image plane by a light detector, each reading being compared with other readings until an acceptable level within a preset tolerance range identified.

When an acceptable reading is obtained, the alignment of the lamp is set at the position which provides the acceptable light level reading. A problem with this prior art technique is that while the final lamp alignment may be within specification, it may not be the most optimum rotational position. Another disadvantage is the time consuming methodology which is used.

It would be desirable to initialize lamp performance more quickly and to select the position which will produce optimum performance, not merely within spec performance. According to a first aspect of the present invention, the lamp illumination output reflected from the platen and transmitted through the optical system is directed to a linear photosensor array positioned at the image plane. Illumination profile data is amplified and recorded by a computer controlled data acquisition device. Software operated within the computer calibrates all data acquisition, and provides graphical displays of calculated illumination characteristics on a display screen. An operator can change the rotational position of the illumination lamp relative to the reflector through an entire 360° rotation while viewing the display screen to select the optimum position as indicated by a displayed bar graph or, alternatively, while viewing a displayed axial illumination profile.

According to another aspect of the invention, the screen display can be used to select and adjust an infrared densitometer to correct for differences in illumination lamp, infrared densitometer sensitivity, and patch densities.

The following prior art references are believed to be of interest:

U.S. Pat. No. 4,464,681 to Jacobs et al. discloses a method and apparatus for adjusting a facsimile document scanner wherein a test pattern is scanned by an array of photodiodes to detect optical path misalignment. The output from the photodiode is displayed on an oscilloscope. A user can then move the photodiode array to adjust the optical path. FIG. 5 shows the photodiode output for a perfectly aligned device. See Col. 4, lines 11-57.

U.S. Pat. No. 4,943,834 to Maeda et al. discloses an image forming apparatus capable of detecting, analyzing and displaying spectroscopic color data of an original wherein an array of sensors is used to detect color data which in turn is used for determining the amount of toner needed for a particular color image. Once an image is scanned, the color characteristic of that particular image are displayed to an operator so that adjustments can be made before a copy is produced. See Col. 4, lines 18-29.

U.S. Pat. No. 4,467,364 to Konagaya discloses a device for measuring tone correction wherein tone density is analyzed and displayed as a correction curve on a monitor. A user can then adjust a tone control circuit as a monitor is observed in order to correct any errors. See Col. 2, lines 39-49. A television camera is used for scanning an image.

Also of interest is copending application U.S. Ser. No. 07/590,425, filed Sept. 28, 1990 and assigned to the same assignee as the present invention. This application discloses a diagnostic test process for a visual verification of the spatial illumination characteristics of an illumination system used in a raster input scanner (RIS) printing system.

More particularly the invention is directed toward a method for providing initial optimized performance of an illumination and exposure system used to form a latent image at an exposure station of a document on a photosensitive medium, including the steps of:

introducing a linear photosensitive display consisting of a plurality of photodiodes into said exposure station, energizing an illuminator to produce a light output which is transmitted through said exposure station and is incident along the length of said array;

converting the output of the photosensitive array into video signals representative of the average illumination output of the illuminator, providing a bar graph on a display screen of said average illumination error superimposed against a horizontal specification line on said display representing a maximum acceptable illumination level, and positioning said illuminator while observing said bar graph and selecting that alignment position of the lamp at which the bar graph is at a minimum value relative to said specification line.

DESCRIPTION OF THE INVENTION

Figure 1:
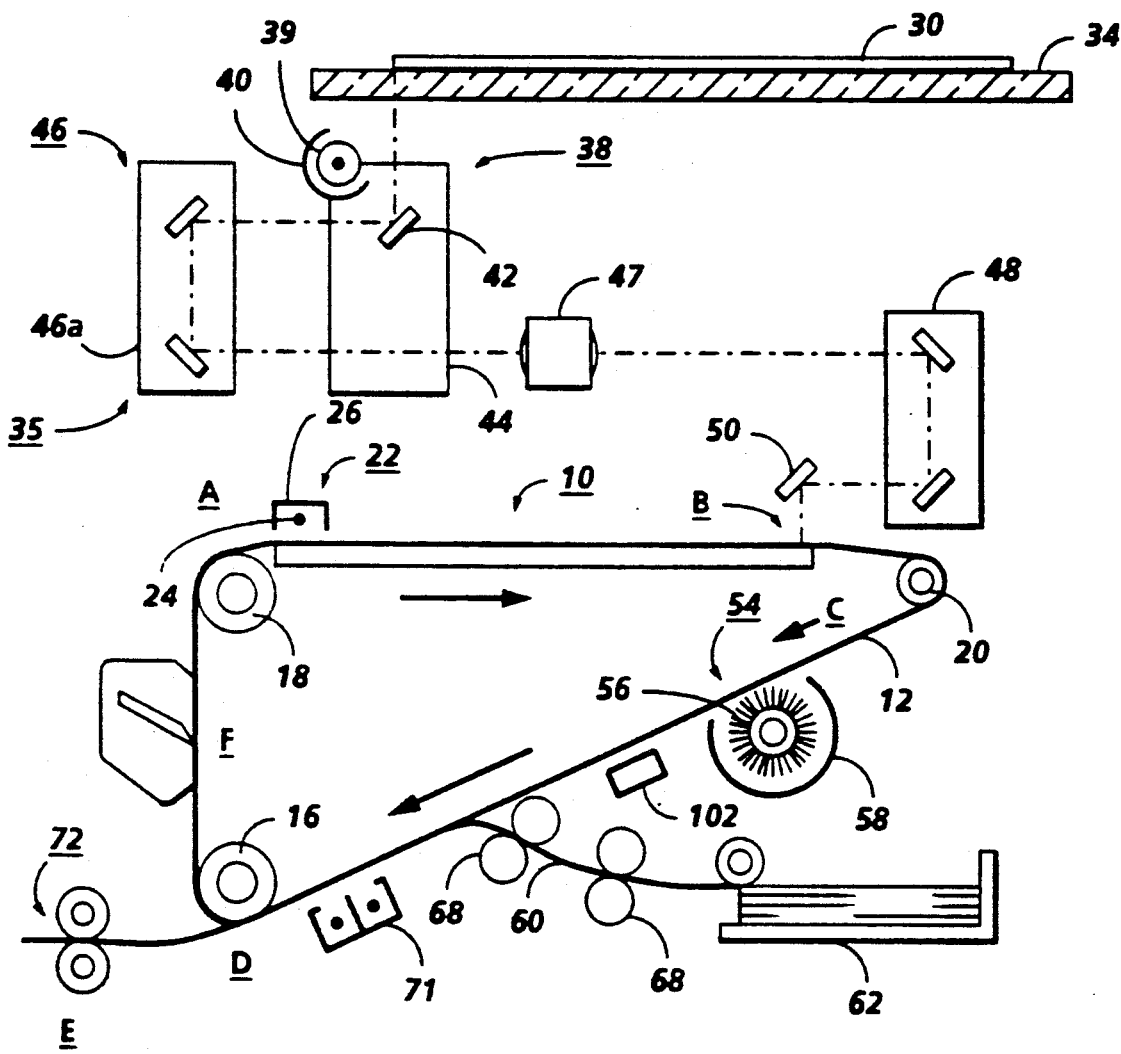
FIG. 1 is a schematic side view of the imaging system of a document reproduction machine in which the present invention is utilized.

For a general understanding of the features of the present invention, reference is made to the drawings. FIG. 1 schematically depicts the various components of an illustrative electrophotographic printing machine incorporating the illumination lamp assembly of the present invention therein. It will become apparent from the following discussion that this lamp assembly is equally well suited for use in a wide variety of electrophotographic printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about drive roller 18 and tension rollers 16, 20. Roller 18 is driven by conventional motor means, not shown.

With continued reference to FIG. 1, a portion of belt 10 passes through charging station A where a corona generating device, indicated generally by the reference numeral 22, charges photoconductive surface 12 to a relatively high, substantially uniform, negative potential. Device 22 comprises a charging electrode 24 and a conductive shield 26.

As belt 10 continues to advance, the charged portion of surface 12 moves into exposure station B. An original document 30 is positioned, on the surface of a transparent platen 34. Optics assembly 35 contains the optical components which incrementally scan/illuminate the document from left to right and project a reflected image onto surface 12 of belt 10 forming a latent image of the document thereon. Shown schematically, these optical components comprise an illumination lamp assembly 38, comprising an elongated tungsten illumination lamp 39 and associated reflector 40. This assembly is described in further detail below. Full rate scan mirror 42, together with other components of assembly 38, is mounted on a scan carriage 44. The carriage ends are adapted to ride along guide rails (not shown) so as to travel along a path parallel to and beneath, the platen. Lamp 39, in conjunction with reflector 40, illuminates an incremental line portion of document 30. The reflected image is reflected by scan mirror 42 to corner mirror assembly 46 mounted on a second scan carriage 46a. Scan carriage 46a is mechanically connected to carriage 44 and adapted to move at ½ the rate of carriage 44. The document image is projected through lens 47 and reflected by a second corner mirror assembly 48 and by belt mirror 50, to form on surface 12 an electrostatic latent image corresponding to the informational areas contained within original document 30.

At development station C, a magnetic brush development system, indicated generally by the reference numeral 54, advances an insulating development material into contact with the electrostatic latent image. Preferably, magnetic brush development system 54 includes a developer roller 56 within a housing 58. Roller 56 transports a brush of developer material comprising magnetic carrier granules and toner particles into contact with belt 10. Roller 56 is positioned so that the brush of developer material deforms belt 10 in an arc with the belt conforming, at least partially, to the configuration of the developer material. The thickness of the layer of developer material adhering to developer roller 56 is adjustable. The electrostatic latent image attracts the toner particles from the carrier granules forming a toner powder image on photoconductive surface 12.

Continuing with the system description, an output copy sheet 60 taken from a supply tray 62 is moved into contact with the toner powder image at transfer station D. The support material is conveyed to station D by a pair of feed rollers 68, 70. Transfer station D includes a corona generating device 71 which sprays ions onto the backside of sheet 60, thereby attracting the toner powder image from surface 12 to sheet 60. After transfer, the sheet advances to fusing station E where a fusing roller assembly 72 affixes the transferred powder image. After fusing, sheet 60 advances to an output tray (not shown) for subsequent removal by the operator.

After the sheet of support material is separated from belt 10, the residual toner particles and the toner particles of develped test patch areas are removed at cleaning station F.

Subsequent to cleaning, a discharge lamp, not shown, floods surface 12 with light to dissipate any residual charge remaining thereon prior to the charging thereof for the next imaging cycle.

Figure 2:
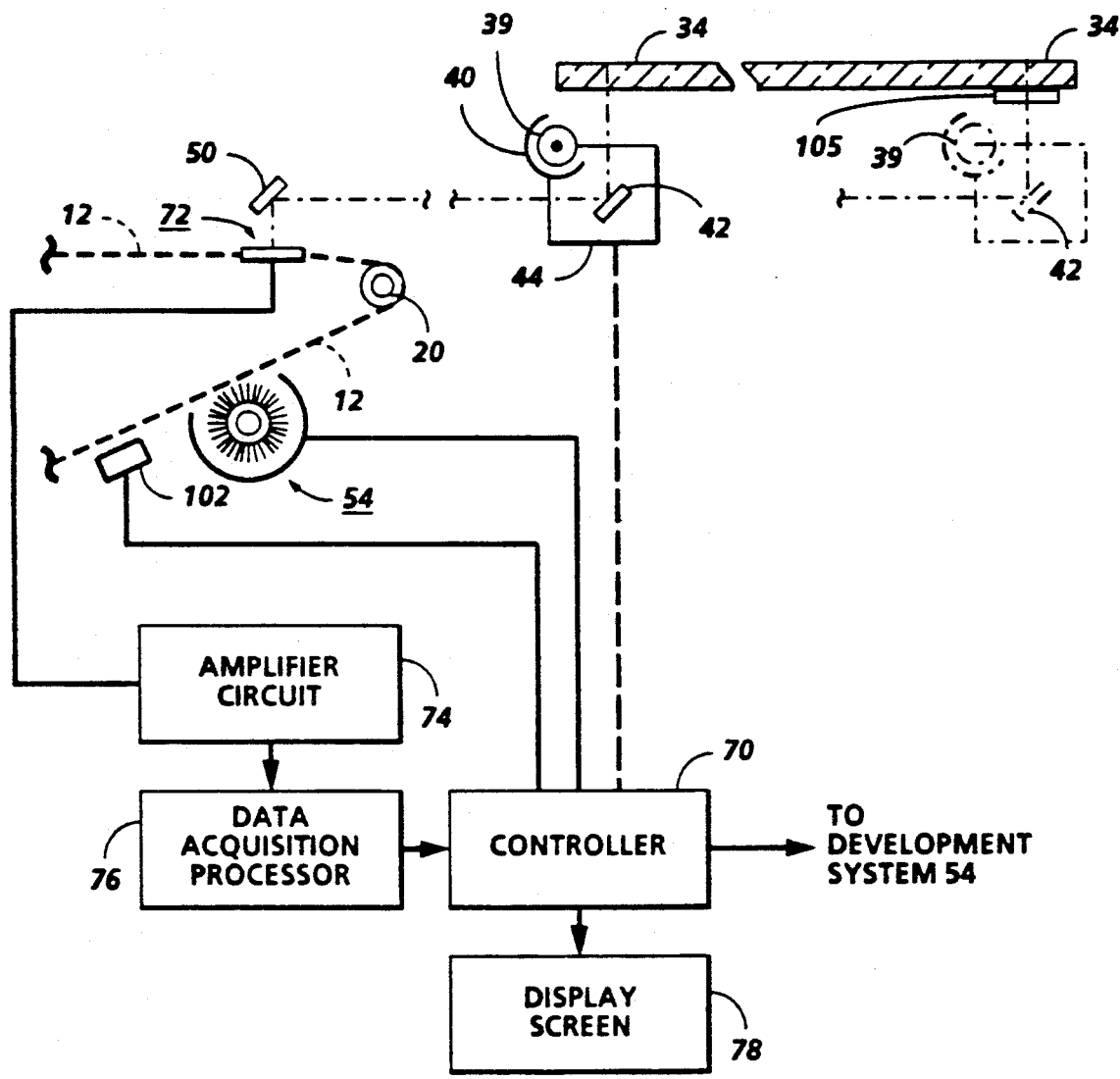
FIG. 2 shows a portion of FIG. 1 combined with a block diagram of the light measuring and display control circuitry.

A controller 70, shown in FIG. 2, incorporating a suitable microprocessor and memory, is provided for operating, in predetermined timed relationships, the various components that comprise machine 10, including the document scan drive components to reproduce the document 30 onto copy sheet 60, as will be understood by those familiar with the art. A suitable controller is disclosed in copending application Ser. No. 798,369 whose contents are hereby incorporated by reference.

Figure 3:
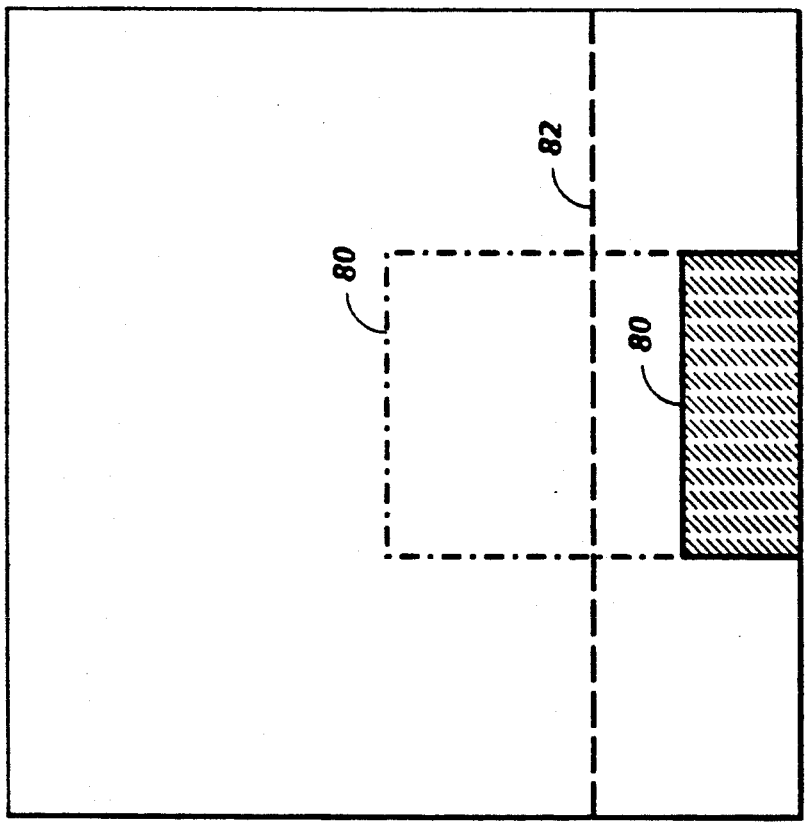
FIG. 3 shows a display screen having a bar graph representative of the lamp illumination uniformity error sensed at a linear photodiode array at the image plane.
Figure 4:
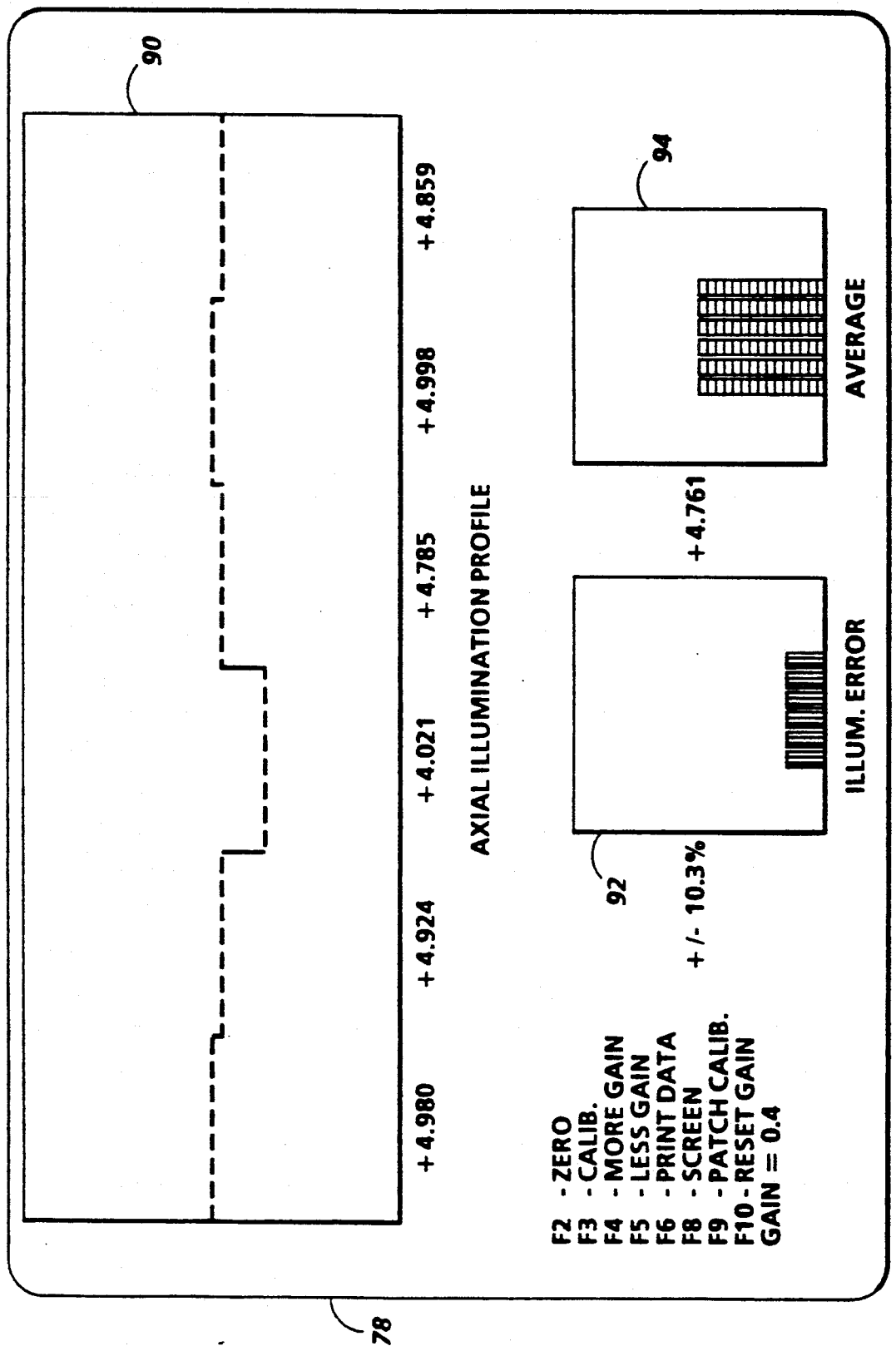
FIG. 4 shows a display screen having an axial illumination profile display representing the illumination magnitude as sensed by the photodiode array as well as the average illumination level and maximum illumination uniformity error.
Figure 5:
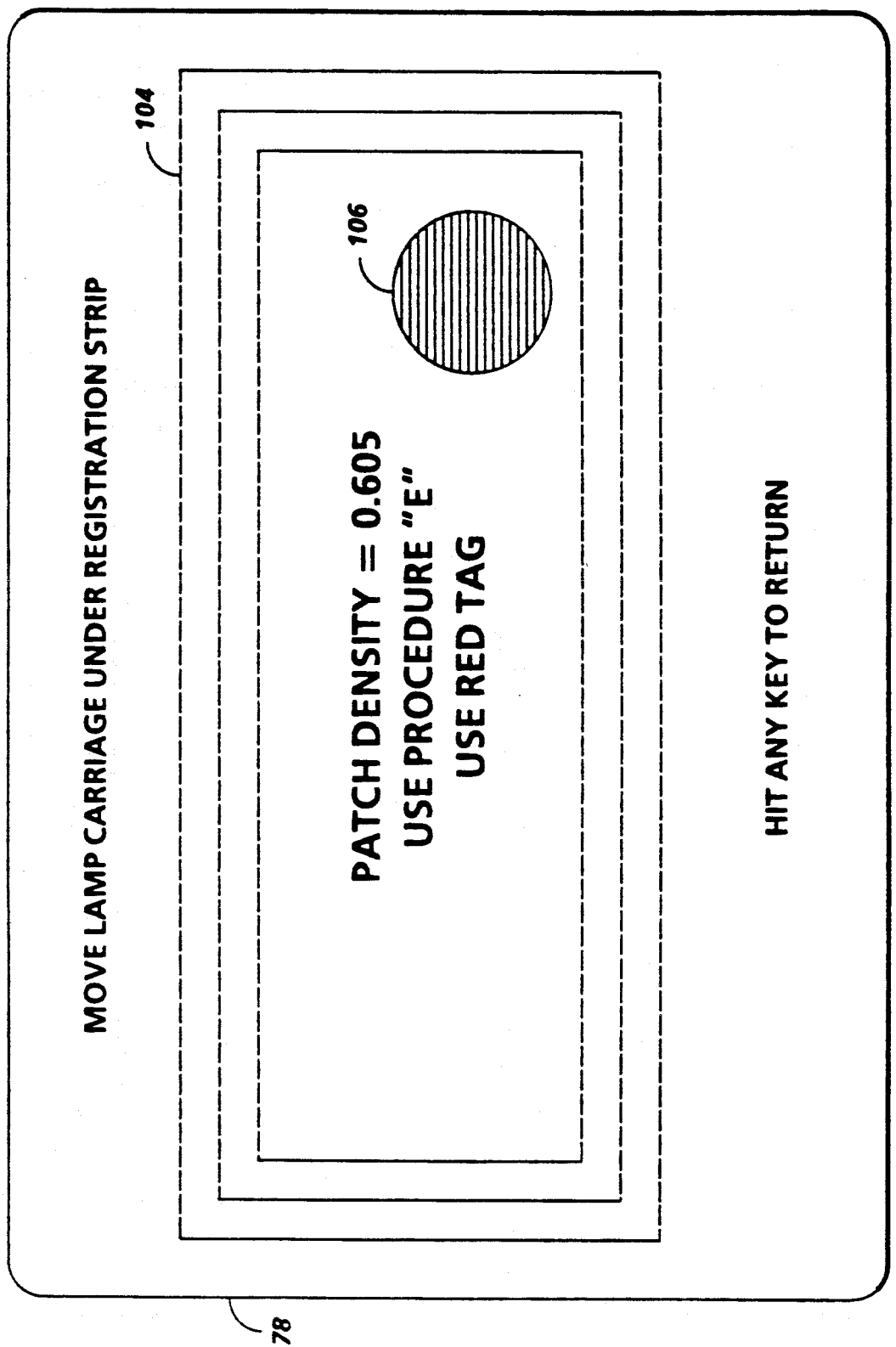
FIG. 5 shows a display screen with a patch densitometer display.

According to a first aspect of the invention, during the assembly and test phase of the optical system, a linear photosensor array is positioned in the image plane; e.g., the plane of the surface 12 of belt 10. FIG. 2 shows an array 72 which in a preferred embodiment consists of 6 photodiodes. The array extends linearly into the page and is of a length approximately equal to the width of belt 10. Each photodiode is mounted in a single row at equally spaced intervals along the array. The illumination profile of lamp 39 at the image plane can now be tested by energizing the lamp and allowing the illumination band reflected from the platen to be transmitted through the optical system and focused as an illuminated line along the length of array 72. The output signals of the individual photodiodes are monitored and transduced by an equal number of transconductance amplifiers in amplifier circuit 74. The outputs of amplifier circuit 74 are a series of analog voltage signals proportional to the illumination energy detected by each of the individual photodiodes. The analog output signals are recorded and converted to digital input signals and forwarded to controller 70 via data acquisition processor 76. Software contained within controller 70 controls the data acquisition processing and provides a graphical display of calculated illumination characteristics at the space screen 78. A computer program which controls the data acquisition and the user interface is provided in the appendix. The program is a Microsoft QuickBasic VER 4.5 program designed to read 6 channels of analog input from processor 76 and to display a graphic representation of real time illumination data. The software routine provides 3 separate graphic displays at a display screen 78. A first screen display, shown in FIG. 3, is a basic screen for manufacturing test purposes. It provides a "go, no go" indication of illuminator performance and an ability to optimize illuminator performance with a live bar chart indicator without a numerical display or need for numerical interpretation. A second display, shown in FIG. 4, is designed for more quantitative engineering use, and provides a graphical representation of the axial illumination profile, a live bar graph of illuminator error, and a live bar graph of average illumination. The third display screen shown in FIG. 5 is used to select and adjust an infrared densitometer to correct for differences in the illumination, infrared densitometer sensitivity and patch density. The operation of each of these screen displays is considered in further detail below.

Turning to FIG. 3, a selection of a first graphic mode associated with the performance of the illumination system enables a first software routine which calculates and displays the illumination error as detected by array 72. Initiation of the first mode causes lamp 39 to be energized and light reflected from the platen and along the optical path to be detected at array 72. The individual outputs of each photodiode are amplified and analog voltage signals sent to processor 76. The lowest and highest readings are identified and their difference is compared with the average value displayed on the screen 78 as the exposure error represented by a vertical bar 80. The height of bar 80 represents the average illumination error computed, and is juxtaposed against a horizontal specification line 82 which represents the maximum acceptable exposure uniformity error for the illumination system. In other words, if bar 80 is above line 82, the illumination error is not within specification; if below line 82, within the specification. In order to obtain the optimum illumination performance, lamp 39 is slowly rotated through 360° by the operator while viewing bar 80. As the lamp is rotated, individual filaments along the lamp length will move in and out of focus until it reaches a position where all filaments are optimally focused. The operator will be able to select the lamp rotational position which corresponds to the lowest position of the bar graph shown in solid form in FIG. 3. According to a second aspect of the invention, the computer driven graphic provides the bar graph with a color which changes dependent on whether the bar is above or below lamp 82. For example, when the indicator bar is above line 82, the bar will be colored red. When below line 82, the coloring changes to green.

Turning now to FIG. 4, selection of a second graphic mode brings to the screen three separate displays: an axial illumination profile display 90, illumination error display 92, and average illumination display 94. The illumination magnitude is indicated by the line position. Display 90 displays a numerical voltage level at each of the 6 amplified photodiode outputs. The numerical data has been corrected for both zero and gain differences. Display 92 is a smaller bar graph figure of the FIG. 3 display with an associated nominal exposure uniformity numerical display error. Display 94 shows the average illumination provided by lamp 39 along with the numeric value. In this second mode, a test engineer can rotate lamp 39 and perform calibration type checks and settings for the individual photodiodes and store these values. It also enables correction to be made within the software to provide adjustments to individual photodiode gains, and to correct for stray light effects or DC offset in amplifier 74 circuit. Function key assignments are displayed in the lower left corner of the screen allowing access to other functions. As with the FIG. 3 display, color-coding may be used to differentiate and highlight each of the subdisplays.

Referring again to FIGS. 1 and 2, an infrared densitometer 102 is positioned adjacent belt 10 and located between development station C and transfer station D. Infrared densitometer directs infrared light onto surface 12 upon appropriate signals from the controller 70. The ratio of reflected light on a developed area to that of a bare area is an indication of toner patch developability. The densitometer generates output signals and send s them to controller 70 through appropriate conversion circuitry. The controller operates upon these signals and sends appropriate output signals to development system 54 to control dispensing of toner particles. Densitometer 102 is also used to periodically measure the light rays reflected from the bare photoconductive surface (i.e. without developed toner particles) to provide a reference level for calculation of the signal ratios. It is necessary to initially optimize operation of densitometer 102 to adjust for differences in the output of lamp 39, the sensitivity of the densitometer and patch density. This optimization is enabled by selection of a third graphic mode to bring to display screen 78 a patch density display 104 shown in FIG. 5.

Referring to FIGS. 2 and 5, selection of this third graphic mode image energizes lamp 39 and causes carriage 44 to move to the right under the control of controller 70. The carriage stops at the dotted line position beneath a patch density target 105. Target 105 extends linearly a short distance along the platen width (into the page). Light reflected from the target 105 is thus detected by at least one of the photodiodes within array 72. The amplified output signal from the photodiode is identified by comparison with the relatively large output levels of the other five photodiodes. The software routine associated with the third graphic mode calculates a patch density value which is displayed on a patch density line in display 104. Also displayed is information which correlates to specific densitometer set up procedures which have previously been assigned a letter designation. As an example, and displayed on the screen, is a patch density which is associated with a preselected "Procedure E". A circle 106 is also on display which gives a color indication of the color of the tag that the operator installs on each lamp, including the proper IR densitometer setup. An operator can then make adjustments, as shown in FIG. 2, to the densitometer sensitivity and to the biasing at the development station 54.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. A method for providing initial optimized performance of an illumination and exposure system used to form a latent image at an exposure station of a document on a photosensitive medium, including the steps of:
   introducing a linear photosensitive display consisting of a
   plurality of photodiodes into said exposure station,
   energizing an illuminator to produce a light output which is transmitted through said exposure station and is incident along the length of said array,
   converting the output of the photosensitive array into video signals representative of the average illumination output of the illuminator,
   providing a bar graph on a display screen of said average illumination error superimposed against a horizontal specification line on said display representing a maximum acceptable illumination level, and
   positioning said illuminator while observing said bar graph and selecting that alignment position of the lamp at which the bar graph is at a minimum value relative to said specification line.

2. The method of claim 1 including the further steps of:
   providing a first color to the bar graph when the graph measurement is greater than said specification line and a second color when the bar graph magnitude is below the specification line.

3. The method of claim 1 including the further step of:
   providing a second display on said display screen which shows the average voltage level output of each of said photodiode.

* * * * *